(12) United States Patent
Cross et al.

(10) Patent No.: US 7,818,575 B2
(45) Date of Patent: Oct. 19, 2010

(54) EFFICIENT RETRIEVAL OF CRYPTOGRAPHIC EVIDENCE

(75) Inventors: David B. Cross, Redmond, WA (US); Kelvin S. Yiu, Seattle, WA (US); Philip J. Hallin, Port Townsend, WA (US); Ryan M. Hurst, Woodinville, WA (US); Vishal Agarwal, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/166,884

(22) Filed: Jun. 24, 2005

(65) Prior Publication Data

US 2006/0294576 A1 Dec. 28, 2006

(51) Int. Cl.
*H04L 9/32* (2006.01)
(52) U.S. Cl. ...................................................... 713/175
(58) Field of Classification Search .................... 726/1; 713/175
See application file for complete search history.

(56) References Cited

U.S. PATENT DOCUMENTS

| | | | | |
|---|---|---|---|---|
| 5,803,808 | A * | 9/1998 | Strisower | 463/11 |
| 6,141,454 | A * | 10/2000 | Seymour et al. | 382/243 |
| 6,487,658 | B1 * | 11/2002 | Micali | 713/158 |
| 6,732,101 | B1 * | 5/2004 | Cook | 707/10 |
| 7,116,970 | B2 * | 10/2006 | Brusilovsky et al. | 455/411 |
| 7,293,289 | B1 * | 11/2007 | Loc et al. | 726/23 |
| 2002/0004773 | A1 * | 1/2002 | Xu et al. | 705/36 |
| 2004/0230797 | A1 * | 11/2004 | Ofek et al. | 713/168 |
| 2008/0244264 | A1 * | 10/2008 | Umezawa et al. | 713/158 |

OTHER PUBLICATIONS

Peifang Zheng, "Tradeoffs in Certificate Revocation Schemes", 2003, ACM SIGCOMM Computer Communications Review pp. 103-112.*

* cited by examiner

*Primary Examiner*—Kimyen Vu
*Assistant Examiner*—John B King
(74) *Attorney, Agent, or Firm*—Woodcock Washburn LLP (57) ABSTRACT

An efficient protocol for retrieving cryptographic evidence may be selected by evaluating a local policy and a number of relevant factors. Furthermore, updated cryptographic evidence may be prefetched during a time period in which there is a low volume of requests for cryptographic evidence. This low volume time period may be defined, approximately, as an overlapping window in which both a first cryptographic evidence publication and a second cryptographic evidence publication are valid.

3 Claims, 7 Drawing Sheets

EFFICIENT RETRIEVAL OF CRYPTOGRAPHIC EVIDENCE

BACKGROUND OF THE INVENTION

Cryptographic statements such as, for example, but not limited to, X.509 certificates and XrML licenses, enable secure and verifiable communication. To validate the status of or the trustworthy nature of a cryptographic statement, it is often necessary to acquire additional information, which may be referred to as cryptographic evidence. This cryptographic evidence may include references to additional cryptographic statements. The cryptographic statement that is being validated may include a number of locators such as, for example, uniform resource locators (URL's), that point to the locations of the necessary cryptographic evidence. To retrieve this cryptographic evidence, a number of different cryptographic evidence retrieval schemes have been developed. These schemes may include protocols and methods such as, for example, but not limited to, a certificate revocation list (CRL), online certificate status protocol (OCSP), simple certificate validation protocol (SCVP), and delegated path validation (DPV).

CRL is an earlier developed cryptographic evidence retrieval scheme that bundles evidence for a collection of cryptographic statements onto a single list. The list may be downloaded and cached so that it is accessible to a client. When one of the cryptographic statements within the collection is being validated by the client, the necessary evidence within the list is identified and re-validated. If the cached evidence is no longer valid, then an on-demand wire retrieval process may be used to obtain the updated valid evidence. CRL is advantageous because, assuming that the evidence on the list is still valid, it alleviates the need to retrieve evidence every time a cryptographic statement is validated. On the other hand, however, CRL is limited in that it requires an entire list of evidence to be downloaded even if only a small number of cryptographic statements need to validated. This limitation may be analogous to downloading an entire telephone book when there is only interest in small number of telephone listings.

To overcome this problem, later developed cryptographic evidence retrieval schemes focused on reducing the quantity of evidence that needed to be downloaded. In particular, OCSP is a cryptographic evidence retrieval scheme that enables a CRL list to be partitioned down to indicate a validation status for a single cryptographic statement. OCSP may be analogous to dialing directory assistance, rather than downloading an entire telephone book, to obtain information for a single telephone listing. While OCSP obviously provides advantages in scenarios where a smaller number of cryptographic statements are being validated, the effectiveness of OCSP is limited, often when a larger number of cryptographic statements are being validated. In particular, OCSP requires a query to be submitted every time that a known set of cryptographic statements needs to be validated, and a typical OCSP response is one to two kilobytes in length. Accordingly, when a large number of independent or duplicate cryptographic statements from the same issuer are being validated, it is often more economical to use CRL rather than OCSP. For example, if each OCSP response is assumed to be two kilobytes, a client may request, retrieve and cache 100 megabytes or more of OCSP responses after validating 50,000 cryptographic statements. By contrast, if each CRL entry is assumed to be 80 bytes, a CRL list with 50,000 entries will only be 4 megabytes in size. Moreover, in addition to requiring caching of a larger amount of data in the aggregate, the employment of OCSP may also require the management of a larger number of objects. Furthermore, implementation of OCSP may also result in additional protocol overhead in comparison with implementation of CRL.

In addition to the problems set forth above, OCSP is also limited in that it may result in user experience problems arising from problematic network conditions. For example, the retrieval can be time consuming due to, for example, the size of cryptographic statements being retrieved, connection bandwidth, network load, server load and bandwidth, and network latency. The retrieval may also fail due to, for example, server unavailability, the physical location of the user, network equipment failure, and other like problems. These limitations are amplified by the fact that a cryptographic statement often has a limited life span, and, once this life span has expired, the cryptographic statement typically cannot be relied upon. Conventional applications typically handle this problem in one of three ways: prompting the user with an often incomprehensible message; failing the operation; or simply assuming that the statement is trustworthy and ignoring the retrieval failure.

SUMMARY OF THE INVENTION

The present invention is directed to efficient retrieval of cryptographic evidence. An efficient cryptographic evidence retrieval scheme may be selected in accordance with a local policy and at least one relevant factor. The relevant factor may be, for example, but not limited to, a user preference for a particular cryptographic evidence retrieval scheme.

In an embodiment of the invention, a determination may be made as to whether CRL or OCSP is a more efficient protocol for retrieving cryptographic evidence. To make this determination, one factor that may be considered is whether a stapled OCSP response has been provided along with the cryptographic statement. Another factor may be the quantity of CRL and/or OCSP responses that have been provided along with the cryptographic statement. In particular, if only one type of responses is provided, then this may be an important factor. Additionally, a quantity of cached OCSP responses from the same issuer may be calculated and compared with a predetermined threshold number that, when exceeded, would make OCSP a less desirable alternative. Another factor that may be considered is a default and/or a user preference for either OCSP or CRL.

Furthermore, updated cryptographic evidence may be prefetched during a time period in which there is a low volume of requests for cryptographic evidence. This low volume period may be defined, approximately, as an overlapping window in which both a first cryptographic evidence publication and a second cryptographic evidence publication are valid. To avoid overloading evidence providers with prefetch requests during this low volume period, each requestor may select a random number and the use the random number to calculate a particular time within the low volume period at which to submit its prefetch request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
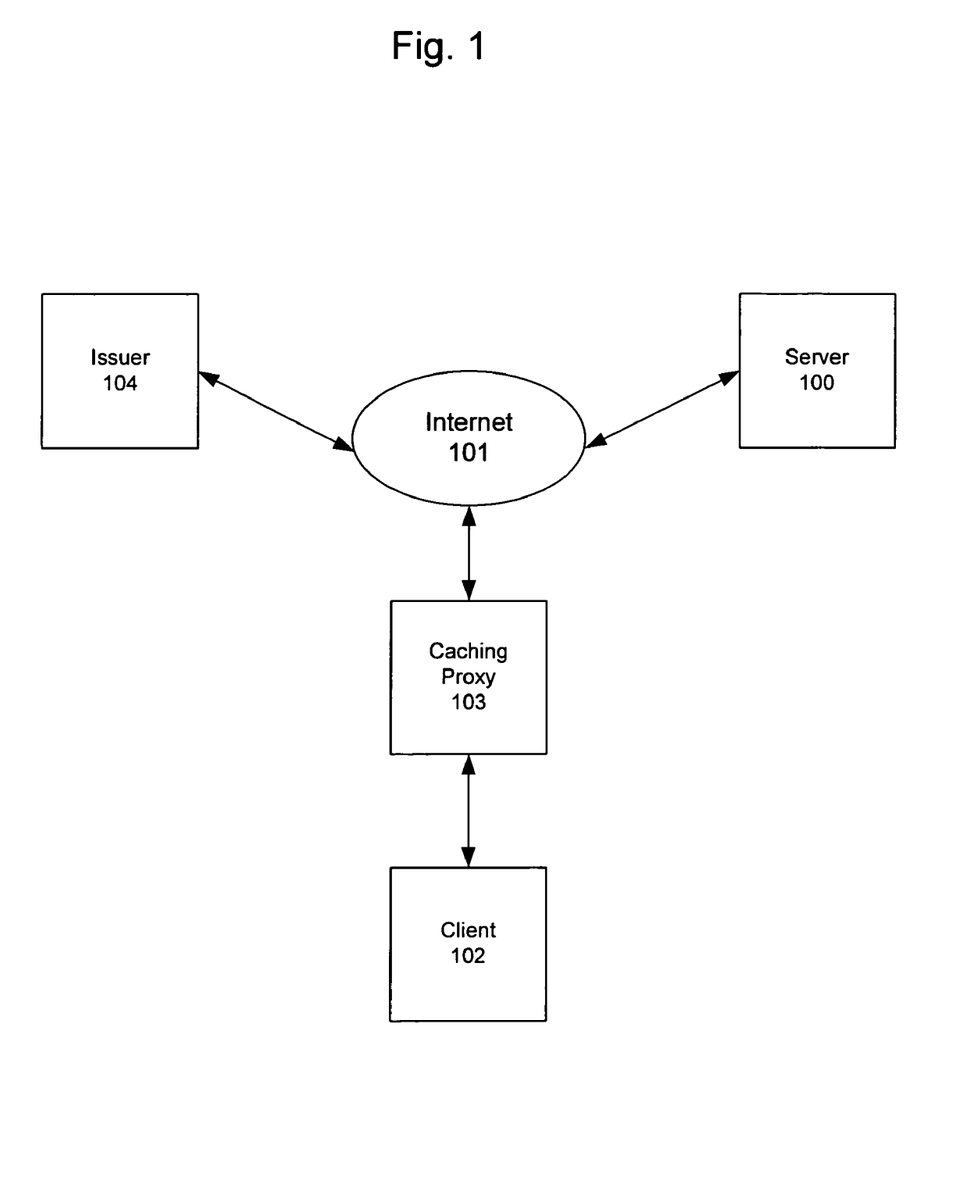
FIG. 1 depicts an exemplary cryptographic statement validation environment in accordance with the present invention.

An exemplary cryptographic statement validation environment in accordance with the present invention is depicted in FIG. 1. Server 100 may transmit data to client 102 via Internet 101, and, to provide security for the data, may also submit a number of cryptographic statements to client 102. These cryptographic statements are originally issued by a trusted issuer 104 such as, for example, a trusted certificate authority. As set forth above, these cryptographic statements may be for example, but not limited to, X.509 certificates and XrML licenses. As should be appreciated, although FIG. 1 depicts Internet 101, cryptographic statements may be transmitted over networks other than the Internet. Server 100 may be, for example, a secure sockets layer (SSL) server that is capable of transmitting private documents via Internet 100.

To validate a cryptographic statement, client 102 may need to retrieve cryptographic evidence, which may include one or more additional cryptographic statements. Caching proxy 103 may be used by client 102 and other connected clients (not shown) to place requests for cryptographic evidence and to cache the cryptographic evidence that is returned. To retrieve cryptographic evidence, client 102 may employ a selected cryptographic evidence retrieval scheme, which, as also set forth above, may be, for example, but not limited to, a certificate revocation list (CRL), online certificate status protocol (OCSP), simple certificate validation protocol (SCVP), and delegated path validation (DPV). In particular, CRL is often, although not always, an advantageous protocol when a large number of cryptographic statements from the same issuer 102 need to be validated. OCSP, on the other hand, is often, although not always, an advantageous protocol when smaller numbers of cryptographic statements are being issued from different issuers 102.

In certain circumstances, cryptographic evidence, such as, for example, an OCSP response, may be stapled along with the cryptographic statement that is provided to client 102. A cryptographic statement may also include a number of extensions that provide locators for the cryptographic evidence necessary to validate the statement. These locators may be, for example, uniform resource locators (URL's). In particular, a CRL distribution point (CDP) extension may provide one or more locators for retrieving a CRL. An authority information access (AIA) extension may provide one or more locators for retrieving OCSP responses. A single cryptographic statement may include both CDP and AIA extensions. The locators within these extensions may be cached upon receiving the cryptographic statement.

Figure 2A:
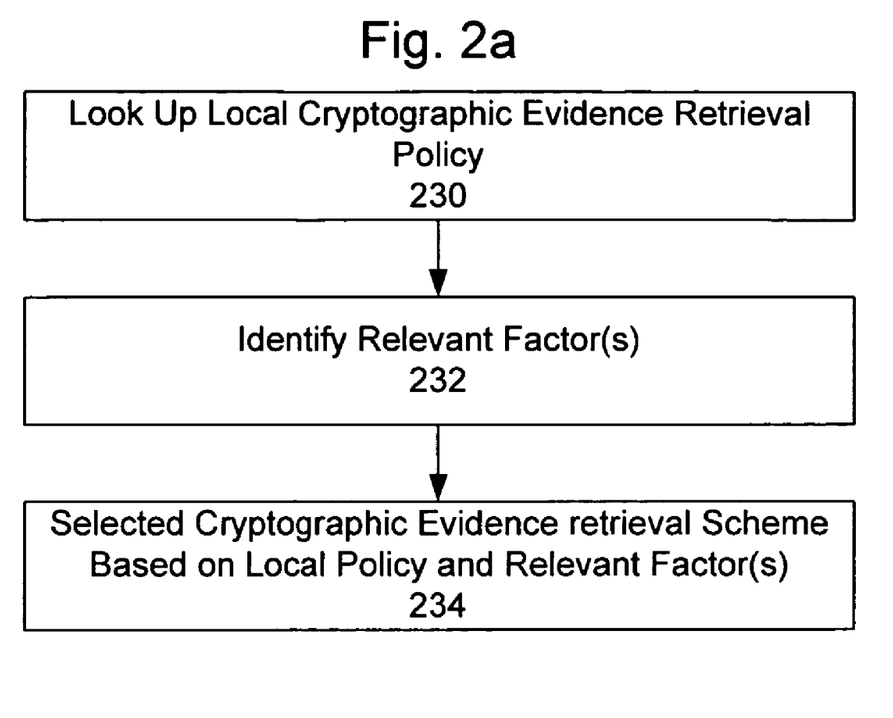
FIG. 2a is a flowchart of an exemplary method for selecting a cryptographic evidence retrieval scheme in accordance with the present invention.
Figure 2B:
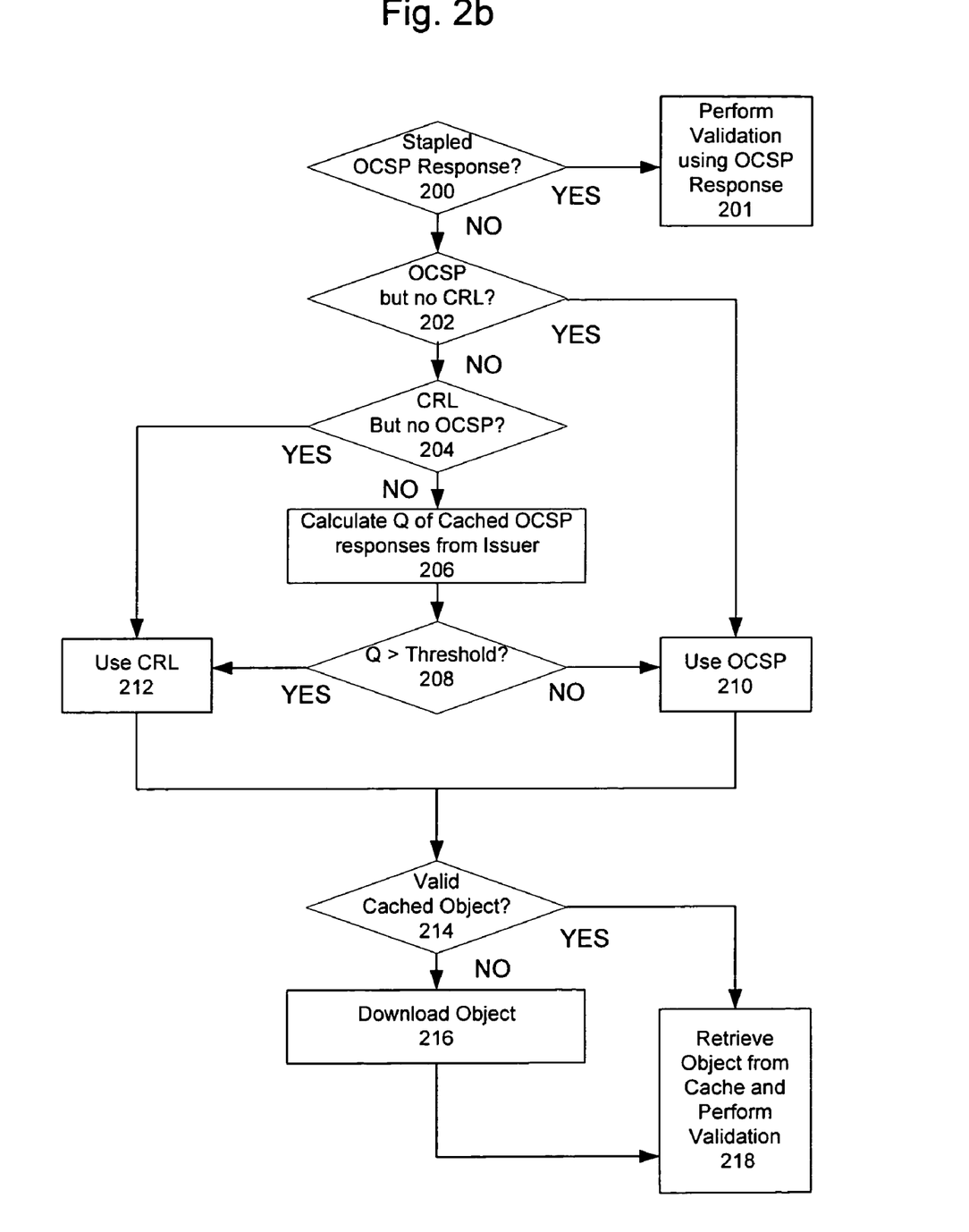
FIG. 2b is a flowchart of an exemplary method for selecting between CRL and OCSP as a cryptographic evidence retrieval scheme in accordance with the present invention.

Flowcharts of two exemplary methods for selecting a preferred cryptographic evidence retrieval scheme in accordance with the present invention are depicted in FIGS. 2a and 2b. Specifically, FIG. 2a depicts a more general method for selecting any available scheme as the preferred scheme, while FIG. 2b depicts a more specific method for selecting either CRL or OCSP as the preferred scheme. Referring now to FIG. 2a, at act 230, a local cryptographic evidence retrieval policy is retrieved. The local policy may provide guidelines and procedures for selecting a cryptographic evidence retrieval scheme and, in certain circumstances, may require that a particular scheme be used. At act 232, one or more factors relevant to the selection of the evidence retrieval scheme are identified. One such factor may be, for example, but not limited to, a user preference for a particular retrieval scheme. Other examples of such factors will be described in detail with reference to the more specific scheme selection method depicted in FIG. 2b. At act 234, a preferred cryptographic evidence retrieval scheme is selected based on both the local policy and the identified relevant factors.

Referring now to FIG. 2b, acts 200-218 depict an exemplary method for determining whether OCSP or CRL is a more advantageous protocol for retrieving cryptographic evidence. At act 200, it is determined whether a time valid, stapled OCSP response has been provided along with the cryptographic statement being validated. If so, then, at act 201, the stapled OCSP response is used to validate the statement.

If not, then, at act 202, it is determined whether the cryptographic statement has OCSP locators but does not have CRL locators. This may occur, if, for example, the cryptographic statement has an AIA extension but does not have a CDP extension. If so, then, at act 210, OCSP is determined to be the selected cryptographic evidence retrieval scheme.

If not, then, at act 204, it is determined whether the cryptographic statement has CRL locators but does not have OCSP locators. This may occur, if, for example, the cryptographic statement has a CDP extension but does not have an AIA extension. If so, then, at act 212, CRL is determined to be the selected cryptographic evidence retrieval scheme.

If the cryptographic statement has both OCSP and CRL locators, then, at act 206, a quantity of cached OCSP responses for the cryptographic statement from the same issuer is calculated. To determine the issuer of an OCSP response, a prefix convention may be employed in which, whenever an OCSP response is cached, each response from the same issuer is assigned the same prefix. This may be accomplished by, for example, hashing a CDP extension and assigning it as a prefix to each OCSP response entry in the cache. Then, at act 206, the quantity of OCSP responses from the same issuer may be determined by counting the number of entries in the cache that have the same prefix.

At act 208, the quantity calculated at act 206 may be compared with a predetermined threshold number. The threshold number may be a user selected number or may also be a default number. The threshold number may be determined by taking into account requests from both high volume devices and low volume devices. High volume devices may be, for example, authentication servers such as domain controllers. Low volume devices may be, for example, personal computers operated by home users. If the quantity calculated at act 206 exceeds the threshold number, then, at act 212, CRL is determined to be the selected cryptographic evidence retrieval scheme. If, on the other hand, the quantity calculated at act 206 does not exceed the threshold number, then, at act 210, OCSP is determined to be the selected cryptographic evidence retrieval scheme. The determination of whether to use CRL or OCSP may also be based, at least in part, on a user preference and/or a default preference for one protocol or the other. These user and/or default preferences may also play a role in the determination of the threshold number.

At act 214, it is determined whether there is a valid cryptographic evidence object stored at the caching proxy 103. Issuer 104 may assist in this determination by assigning special headers to cryptographic evidence that is submitted to caching proxy 103. In particular, one such special header, which may be referred to as a "cache-control" header, may specify a maximum time period ("max-age") for which caching proxy 103 may cache the cryptographic evidence without the need to re-validate the evidence with issuer 104. For example, client 102 may submit a CRL request to caching proxy 103, which, in turn, forwards the request to issuer 104. Issuer 104 may then provide the CRL to caching proxy 103 at 9:00 a.m. on June 1. Issuer 104 may specify a max-age of 86,400 seconds (24 hours) in a cache-control header along with the CRL. The CRL may then be forwarded to client 102. At 8:00 a.m. on June 2, a second connected client may request the same CRL from caching proxy 103. Because this second request is received at caching proxy 103 less than 24 hours after receiving the CRL from issuer 104, caching proxy 103 may provide the CRL to the second connected client without first re-validating the CRL with issuer 104. Later, at 10:00 a.m. on June 2, a third connected client may request the same CRL from caching proxy 103. This time, because the third request is received at caching proxy 103 more than 24 hours after receiving the CRL from issuer 104, caching proxy 103 must re-validate the CRL prior to providing it to the third connected client.

Another special header that may be assigned by issuer 104 may enable, upon re-validation of evidence, a determination to be made as to whether the evidence has been updated since the last time it was downloaded or validated from issuer 104. For example, if this header is assigned to the CRL in the above example, then, when caching proxy 103 re-validates the CRL for the third connected client, caching proxy 103 need only re-download the CRL from issuer 104 if the header indicates that it has been updated subsequent to 9:00 a.m. on June 1. This header may be referred to as an "Etag."

If, at act 214, it is determined that there is a valid cached object, then, at act 218, the object is retrieved from the caching proxy server 103 or through whatever protocol or mechanism that is appropriate and used to validate the cryptographic statement. On the other hand, if, at act 214, it is determined that there is not a valid cached object, then the object is first downloaded at act 216 and then used to perform validation at act 218.

As set forth above, when cryptographic evidence is downloaded from an issuer 104, special headers may be assigned to the cryptographic evidence to set the lifespan within which the evidence may be cached without the need to re-validate the evidence. In many circumstances, once this lifespan expires, it may be desirable to prefetch updates to the cached evidence, meaning that the cached evidence will be updated even before it is actually requested by a client 102. Prefetching may improve the response time for providing evidence once it is actually requested by a client 102. Also, the value of prefetching may be maximized when it is performed during a time period in which there is a low volume of requests for cryptographic evidence. This reduces latency during the low volume time period and also increases bandwidth during higher volume periods. This low volume period may be defined, approximately, as an overlapping window in which both a first cryptographic evidence publication and a second cryptographic evidence publication are active.

Figure 3:
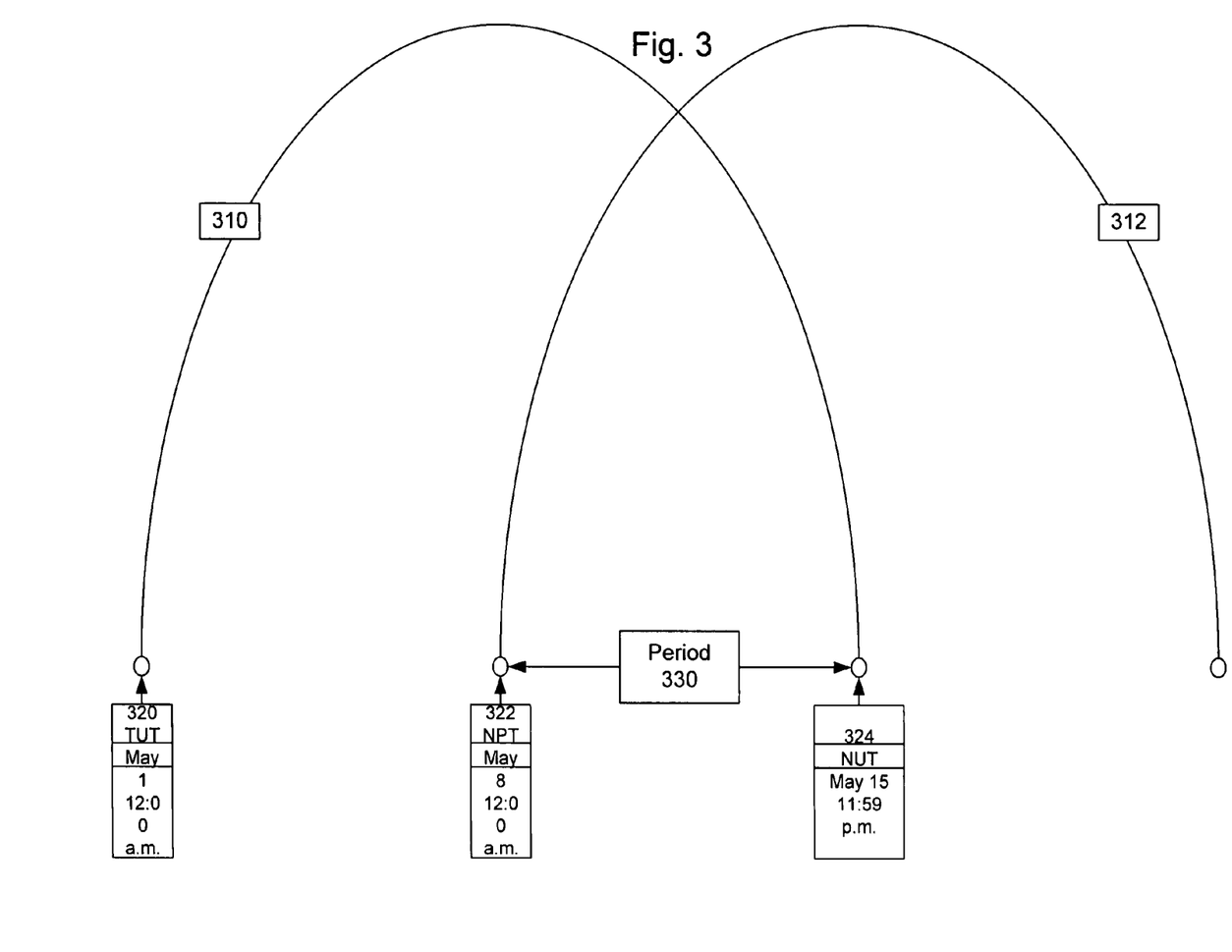
FIG. 3 depicts an exemplary low volume time period in accordance with the present invention.

An exemplary low volume time period in accordance with the present invention is depicted in FIG. 3. In this example, a new cryptographic evidence publication may be issued on a weekly basis, and each publication may remain valid for a fourteen day period. Arc 310 represents a lifespan of a first currently valid cryptographic evidence publication, while arc 312 represents a lifespan of a second currently valid cryptographic evidence publication. This update time (TUT) 320 represents the time at which the first publication was issued, namely, May 1 at 12:00 a.m. Next update time (NUT) 324 represents the time at which the first publication expires, namely, May 14 at 11:59 p.m. Next publish time (NPT) 322 represents the time at which the second publication was issued, namely, May 8 at 12:00 a.m. A prefetch time at which to prefetch the updated cryptographic evidence may be selected as some time within period 330. To avoid overloading an issuer 104 with prefetch requests during period 330, each requestor may select a random number and use it to calculate its own prefetch time within period 330. Also, to provide a margin for error, an adjusted time period may be used when calculating the prefetch time. The adjusted time period may be calculated by inserting small delta time periods after NPT 322 and before NUT 324.

Figure 4:
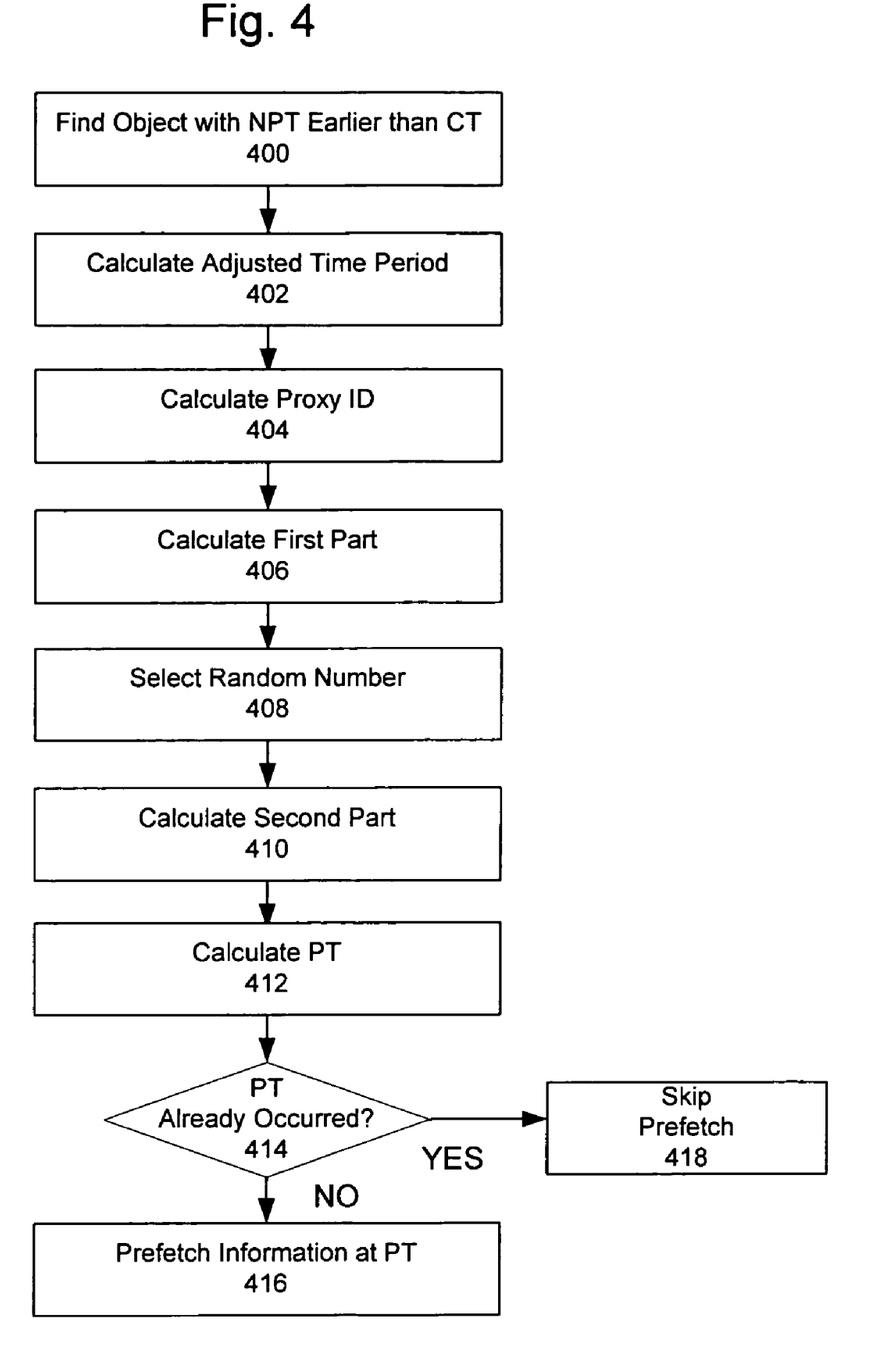
FIG. 4 is a flowchart of an exemplary method for calculating a prefetch time in accordance with the present invention.

FIG. 4 is a flowchart of an exemplary method for calculating a prefetch time in accordance with the present invention. Prior to performing the method depicted in FIG. 4, a determination may be made as to how frequently a particular issuer 104 is checked. If the issuer 104 is checked very infrequently, then a smaller number of OCSP responses may be preferred over other schemes. On the other hand, if the issuer 104 is checked frequently, then the pre-fetch may be more warranted. Also, a prefetch priority may be determined that corresponds to the frequency at which the issuer 104 is checked. The more frequently that the issuer 104 is checked, the higher its priority may be.

At act 400, an evidence cache may be scanned to identify a publication with an NPT that is earlier than the current time (CT), which, in the example of FIG. 3, would be the second publication 312. At act 402, the adjusted time period is calculated. For example, if a delta period is set to be four hours, then, continuing with the example of FIG. 3, the adjusted time period may extend from 4:00 a.m. on May 8 to 7:59 p.m. on May 15. At act 404, a proxy identifier is calculated. The proxy dentifier may be calculated based on caching information such as, for example, the identity of caching proxy 103 and a hash of the Etag and the last modified time that were provided along with the original version of the cryptographic evidence being updated. If all of these pieces of caching information are unavailable, then the proxy identifier may be set to zero.

At act 406, a first part of the prefetch time (PT) may be calculated. The first part may be calculated as the modulus of the proxy identifier and half of the adjusted time period. At act 408, a large random number may be selected. At act 410, a second part of the prefetch time is calculated. The second part may be calculated as the modulus of the random number and half of the adjusted time period. At act 412, the prefetch time is calculated. The prefetch time may be calculated as the sum of the NPT, the delta period, the first part, and the second part. At act 414, it is determined whether the calculated prefetch time has already occurred. If so, then the prefetch may be skipped until and then recalculated at a later time such as, for example, after the first publication expires. If the prefetch time has not yet occurred, then the prefetch may be requested at the prefetch time. If the prefetch does not run at the calculated prefetch time, then a new adjusted time period may be computed by incrementing the NUT by the lesser of the delta period and the difference between the original TUT and NUT. The exemplary method of FIG. 4 may then be repeated using the new adjusted time period to calculate a new prefetch time at which to re-attempt the prefetch.

Accordingly, as set forth above with reference to FIGS. 1-4, the present invention is directed to efficient retrieval of cryptographic evidence. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 5:
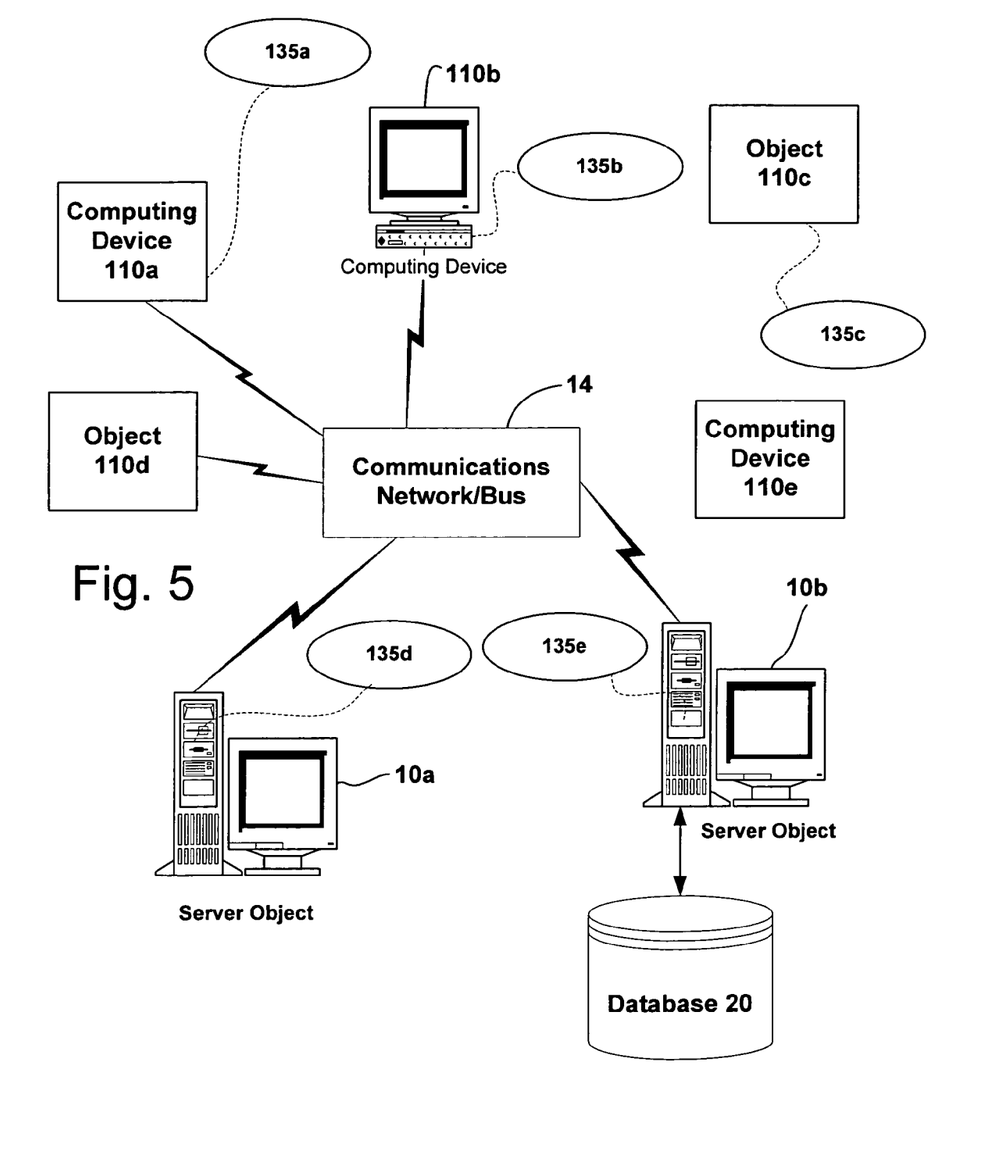
FIG. 5 is a block diagram representing an exemplary network environment having a variety of computing devices in which the present invention may be implemented.

FIG. 5 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 5, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related.

Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 5 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 10a, 10b, etc. and other like devices, and databases 20.

FIG. 5 and the following discussion are intended to provide a brief general description of a suitable computing device in connection with which the invention may be implemented. For example, any of the client and server computers or devices illustrated in FIG. 5 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 6:
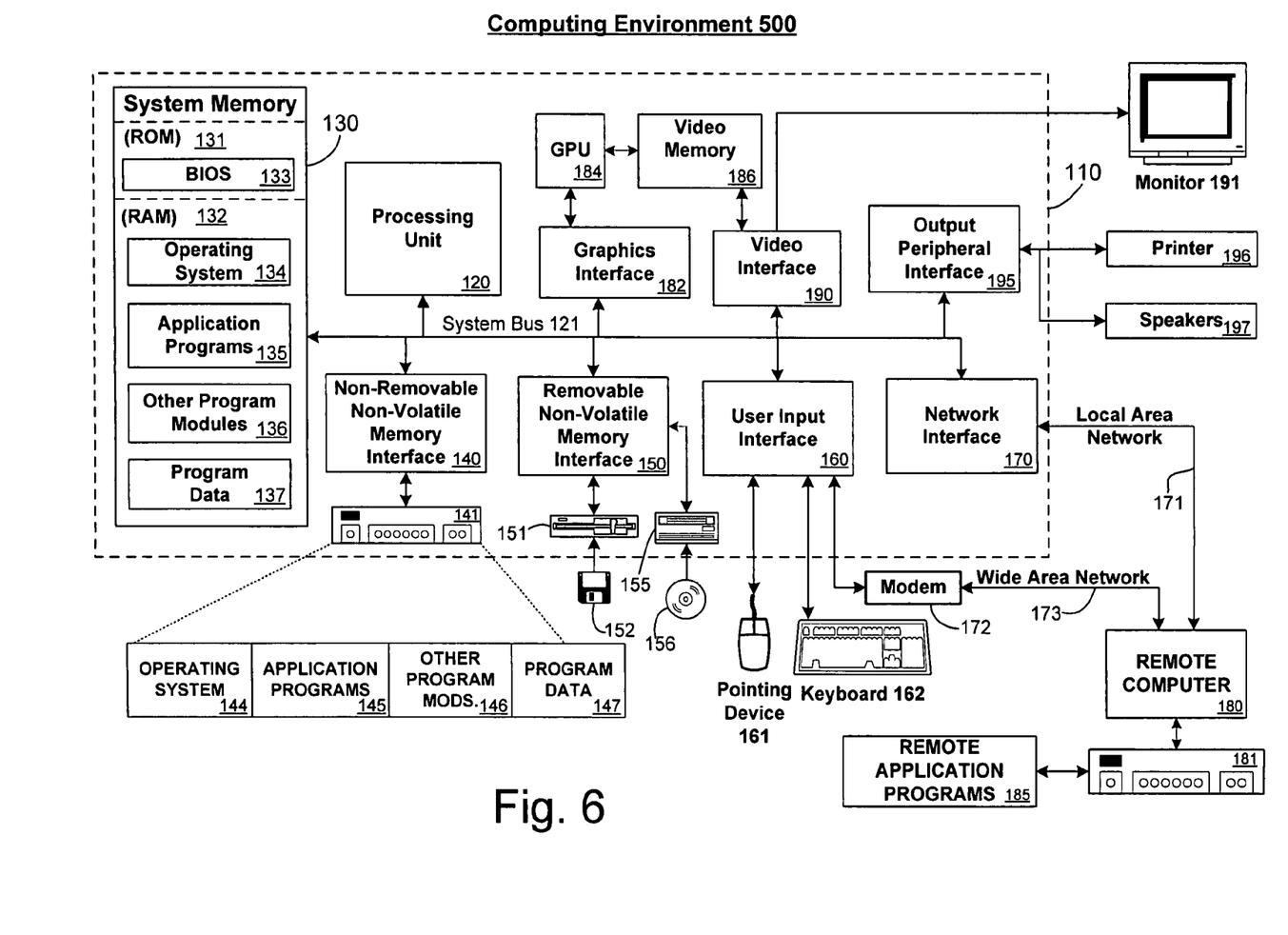
FIG. 6 is a block diagram of an exemplary representing an exemplary computing device in which the present invention may be implemented.

FIG. 6 thus illustrates an example of a suitable computing system environment 600 in which the invention may be implemented, although as made clear above, the computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6 provide storage of computer readable instructions, data structures, program modules and other data for the computer 110. In FIG. 6, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

CONCLUSION

Thus, the efficient retrieval of cryptographic evidence has been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for efficiently prefetching cryptographic evidence, the method comprising:
    identifying by at least one computer processor a next update time at which a first cryptographic evidence publication ceases to be valid;
    identifying a next publish time at which a second cryptographic evidence publication becomes valid; and
    selecting by the at least one computer processor a prefetch time that is a time between the next publish time and the next update time, wherein the prefetch time is selected as a function of a random number, wherein selecting the prefetch time comprises:
        calculating a first time by adding a delta time period to the next publish time;
        calculating a second time by subtracting the delta time period from the next update time;
        selecting a third time within an adjusted time period between the first time and the second time by:
            calculating a proxy identifier based on caching information;
            selecting the random number;
            calculating a first part that is a modulus of half of the adjusted time period and the proxy identifier;
            calculating a second part that is a modulus of half of the adjusted time period and the random number; and
            setting the third time to be the sum of the next publish time, the delta time, the first part, and the second part; and
        setting the prefetch time to be the third time; and
    prefetching the cryptographic evidence at the prefetch time.

2. The method of claim 1, further comprising prefetching the cryptographic evidence according to a prefetch priority order corresponding to the frequency with which an issuer of the cryptographic evidence is checked.

3. A computer storage medium, excluding carrier waves, having computer executable instructions that, when executed by a computer, cause the computer to perform acts comprising:
    identifying by at least one computer processor a next update time at which a first cryptographic evidence publication ceases to be valid;
    identifying a next publish time at which a second cryptographic evidence publication becomes valid; and
    selecting by the at least one computer processor a prefetch time that is a time between the next publish time and the next update time, wherein the prefetch time is selected as a function of a random number, wherein selecting the prefetch time comprises:
        calculating a first time by adding a delta time period to the next publish time;
        calculating a second time by subtracting the delta time period from the next update time;
        selecting a third time within an adjusted time period between the first time and the second time by:
            calculating a proxy identifier based on caching information;
            selecting the random number;
            calculating a first part that is a modulus of half of the adjusted time period and the proxy identifier;
            calculating a second part that is a modulus of half of the adjusted time period and the random number; and
            setting the third time to be the sum of the next publish time, the delta time, the first part, and the second part; and
        setting the prefetch time to be the third time; and
    prefetching the cryptographic evidence at the prefetch time.

* * * * *

UNITED STATES PATENT AND TRADEMARK OFFICE
CERTIFICATE OF CORRECTION

| | | |
|---|---|---|
| PATENT NO. | : 7,818,575 B2 | |
| APPLICATION NO. | : 11/166884 | |
| DATED | : October 19, 2010 | |
| INVENTOR(S) | : David B. Cross et al. | |

It is certified that error appears in the above-identified patent and that said Letters Patent is hereby corrected as shown below:

In column 13, line 37, in Claim 1, delete "by;" and insert -- by: --, therefor.

Signed and Sealed this
Eighth Day of February, 2011

David J. Kappos
*Director of the United States Patent and Trademark Office*